United States Patent
Lu et al.

(10) Patent No.: US 11,302,220 B2
(45) Date of Patent: Apr. 12, 2022

(54) TEACHING AND DEMONSTRATION TOOL FOR SIMULATING FABRIC CONSTRUCTION

(71) Applicant: JIANGNAN UNIVERSITY, Wuxi (CN)

(72) Inventors: Yuzheng Lu, Wuxi (CN); Yang Wang, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 193 days.

(21) Appl. No.: 16/755,470

(22) PCT Filed: Nov. 27, 2017

(86) PCT No.: PCT/CN2017/113043
§ 371 (c)(1),
(2) Date: Apr. 10, 2020

(87) PCT Pub. No.: WO2019/071753
PCT Pub. Date: Apr. 18, 2019

(65) Prior Publication Data
US 2021/0209970 A1 Jul. 8, 2021

(30) Foreign Application Priority Data
Oct. 12, 2017 (CN) .......................... 201710948869.2

(51) Int. Cl.
*G09B 19/00* (2006.01)
*G09B 25/00* (2006.01)

(52) U.S. Cl.
CPC .................. *G09B 25/00* (2013.01)

(58) Field of Classification Search
CPC .............................. G09B 19/00; G09B 19/20
USPC ..................................................... 434/83, 96
See application file for complete search history.

(56) References Cited

U.S. PATENT DOCUMENTS

| | | | | |
|---|---|---|---|---|
| 501,675 A | * | 7/1893 | Collins | A63H 33/14 434/83 |
| 735,177 A | * | 8/1903 | Truesdell | D03D 29/00 28/152 |
| 1,632,302 A | * | 6/1927 | Henrye | G09B 19/20 434/95 |

(Continued)

FOREIGN PATENT DOCUMENTS

| CN | 102619017 A | 8/2012 |
|---|---|---|
| CN | 103198738 A | 7/2013 |

(Continued)

*Primary Examiner* — Kurt Fernstrom
(74) *Attorney, Agent, or Firm* — SZDC Law P.C.

(57) ABSTRACT

A teaching and demonstration tool for simulating fabric construction, which is used for demonstrating the fabric construction and assisting in teaching and designing fabric constructions. The teaching and demonstration tool includes a frame body for fixing the warp strips (6) and weft strips (7), and a plurality of pairs of positioning members (3). The frame body includes longitudinal bars (1) and latitudinal bars (2). A plurality of warp strips (6) and weft strips (7) are fixed on the longitudinal bars (1) and the latitudinal bars (2) respectively by the plurality of positioning members (3). Both the longitudinal bars and latitudinal bars (1, 2) are provided with scale lines.

13 Claims, 3 Drawing Sheets

(56) References Cited

U.S. PATENT DOCUMENTS

| | | | | |
|---|---|---|---|---|
| 2,136,552 A * | 11/1938 | Joseph | ............... | D03D 29/00 28/152 |
| 2,176,797 A * | 10/1939 | Jamesy | ............... | B44F 11/02 434/96 |
| 2,632,938 A * | 3/1953 | Kopf | ............... | D03D 29/00 28/152 |
| 3,451,879 A * | 6/1969 | Sue | ............... | B44C 5/005 428/76 |
| 3,752,730 A * | 8/1973 | Koff | ............... | B44F 7/00 428/13 |
| 3,800,372 A * | 4/1974 | Daoust | ............... | D03D 29/00 28/152 |
| 4,006,540 A * | 2/1977 | Lemelson | ............... | B44C 3/00 434/83 |
| D259,302 S * | 5/1981 | Davis | ............... | 139/34 |
| 5,413,150 A * | 5/1995 | Townsend | ............... | D03D 29/00 139/34 |
| 6,149,437 A * | 11/2000 | Corliss | ............... | B44C 3/06 139/29 |
| 6,585,522 B1 | 7/2003 | Simmons | | |
| 9,506,171 B2 * | 11/2016 | Nitta | ............... | D03D 41/00 |
| 9,758,906 B2 * | 9/2017 | Miller | ............... | D03D 29/00 |
| 9,896,789 B2 * | 2/2018 | Okuma | ............... | D03D 29/00 |
| D895,690 S * | 9/2020 | Walker | ............... | D15/66 |
| 2007/0270010 A1 * | 11/2007 | Walter | ............... | D03D 29/00 439/259 |
| 2012/0047960 A1 * | 3/2012 | Sasur | ............... | D04B 5/00 66/1 A |
| 2016/0032500 A1 * | 2/2016 | Novak | ............... | D04B 5/00 28/152 |

FOREIGN PATENT DOCUMENTS

| | | |
|---|---|---|
| CN | 203602836 U | 5/2014 |
| CN | 107111659 A | 8/2017 |
| WO | 2007146141 A2 | 12/2007 |

* cited by examiner

TEACHING AND DEMONSTRATION TOOL FOR SIMULATING FABRIC CONSTRUCTION

This application is the National Stage Application of PCT/CN2017/113043, filed on Nov. 27, 2017, which claims priority to Chinese Patent Application No.: 201710948869.2, filed on Oct. 12, 2017, which is incorporated by reference for all purposes as if fully set forth herein.

FIELD OF THE INVENTION

The invention relates to the textile technology, in particular to an auxiliary appliance for simulating and demonstrating a fabric construction and shape.

BACKGROUND OF THE INVENTION

The woven fabric is usually composed of warp yarn and weft yarn. In the teaching course of woven fabric construction design, it is the main content to study the structure and characteristics of different woven fabrics. However, at present, the woven fabric construction is usually demonstrated and explained by pictures, which are not vivid and visible enough. Especially in the process of yarn dyed fabric construction design, the joints of woven fabric can only be described with drawing on blackboard or simulation pictures generated by computers. It is difficult to demonstrate the color and width ratio of the woven fabric accurately. The teaching effect is nonobjective, and it is difficult to describe the complicated fabric construction accurately. In the process of fabric construction design, the textile factory can only observe the fabric construction by weaving sample sheet, which results in the discontinuation of the normal production, so it is impossible to stop and weaving sample frequently.

SUMMARY OF THE INVENTION

An object of the invention is to provide a demonstration tool for simulating a fabric construction.

For the above purpose, the invention utilizes the following technical solution.

A teaching and demonstration tool for simulating fabric construction, comprising:

a frame body, for fixing warp strips and weft strips; and, a plurality of pairs of positioning members, for fixing two ends of the warp strips and the weft strips respectively on the frame body;

wherein the frame body comprises at least a pair of longitudinal bars and at least a pair of latitudinal bars, and the longitudinal bar and the latitudinal bar are provided with scale lines.

Preferably, the frame body is provided with a plurality of sets of different scale lines.

Preferably, slid rails are opened on the frame body along the longitudinal direction or the latitudinal direction, and the positioning member includes a slider disposed in the slide rails.

Preferably, the positioning member also includes a positioning-nut detachably connected to the slider, when the positioning-nut is connected to the slider, the warp strip or weft strip is fixed between the positioning-nut and the frame body; when the positioning-nut is separated from the frame body, the warp strip or weft strip is detachable from the frame body.

Preferably, the positioning member comprises a positioning-nut elastically attached to the slider, and the warp strip or the weft strip is clamped between the positioning-nut and the frame body.

Preferably, the positioning member comprises a positioning clip connected to the slider, and the warp strip or the weft strip is clamped by the positioning clip.

Preferably, a plurality of continuously arranged positioning-holes are opened on the frame body, the positions of the positioning-holes correspond to the positions of the scale lines, and the positioning members are removably inserted in the positioning-holes.

Preferably, a plurality of positioning members are continuously arranged on the frame body, the positioning member has a hook part, and the ends of the warp strip and the weft strip are hooked on the hook part of the positioning member.

Preferably, both the warp strip and the weft strip have two ends, each of the ends is provided with a hole or ring through which the positioning member can pass.

Preferably, the tool comprises a plurality of warp strips and weft strips of different colors.

Preferably, the tool comprises a plurality of warp strips and weft strips of different widths.

Preferably, the warp strips and the weft strips are braided ribbons.

Preferably, the warp strips and the weft strips are elastic.

Preferably, the frame body is rectangular.

Preferably, the longitudinal bar and latitudinal bar have a length of 20 to 150 cm.

Preferably, the frame body is made of a soft material, and the positioning member has a tip capable of passing through the warp strip or the weft strip and fix it to the frame body.

By means of the above technical solution, compared with the prior art, the invention has the following advantages and effects: the invention can magnified and demonstrated in the same proportion according to the actual fabric construction, which is convenient to observe the fabric construction, and the demonstration effect is intuitive and vivid.

REFERENCE SIGNS IN THE FIGURES

Figure 1:
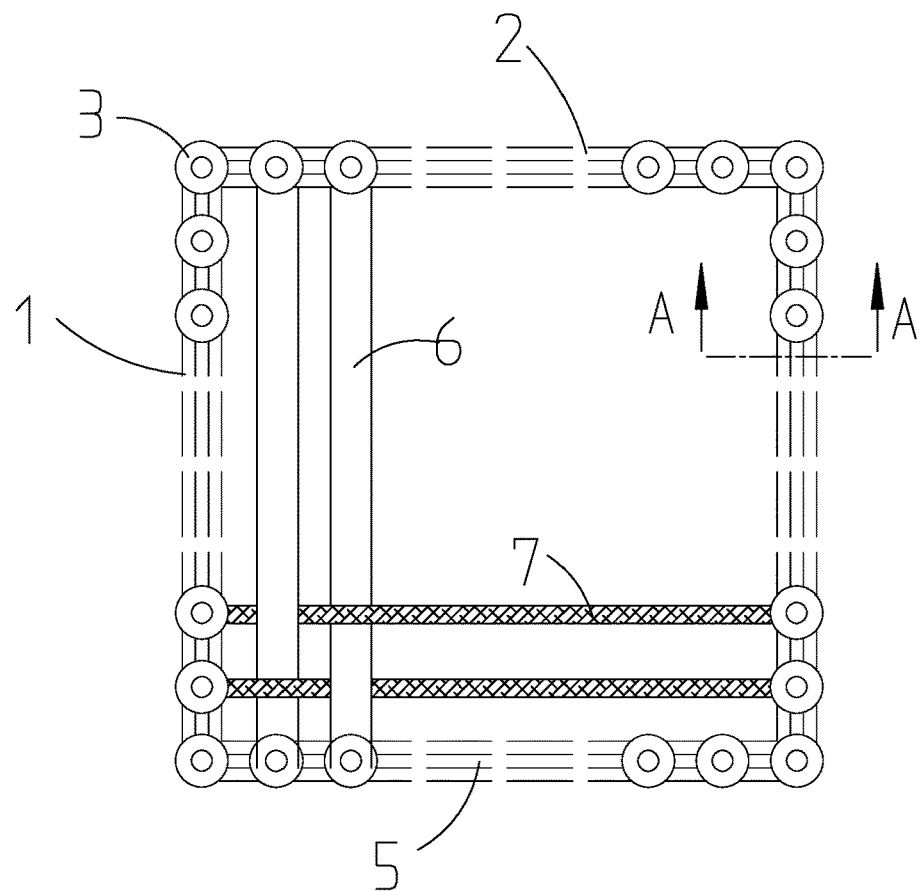
FIG. 1 is a schematic diagram of embodiment 1 of the present invention.

Longitudinal bar 1
Latitudinal bar 2
Positioning member 3
Slider 31
Positioning-nut 32
Positioning-hole 4
Slide rail 5
Warp strip 6
Weft strip 7

DETAILED DESCRIPTION OF THE INVENTION

The invention provides a teaching and demonstration tool for simulating fabric construction, which can proportionally magnify the fabric by 10 to 20 times, and is mainly used to demonstrate the fabric construction and assist the teaching and design of the fabric construction.

The "longitudinal" herein refers to the up-down direction in FIG. 1, and the "latitude" refers to the left-right direction in FIG. 1.

The invention is further illustrated in combination with the accompanying drawings and embodiments:

FIG. 1 shows an embodiment 1 of the present invention. As shown in FIG. 1, a fabric construction simulation tool comprises a frame body, a plurality of warp strips 6 and a plurality of weft strips 7, and a plurality of positioning members 3 for fixing the warp strips 6 and the weft strips 7 on the frame body. The frame body comprises a pair of parallel longitudinal bars 1 and a pair of parallel Latitudinal bars 2. Both the warp strips 6 and the weft strips 7 have two ends, and the length of the warp strips 6 is substantially the same as that of the Longitudinal bar 1. The two ends of the warp strips 6 are respectively connected to a pair of latitudinal bars 2, and the length of the weft strips 7 are substantially the same as that of the latitudinal bar 2, The two ends of the weft strips 7 are respectively connected to a pair of Longitudinal bars 1. Through the shuttle weaving of multiple warp strips 6 and weft strips 7, different structures can be demonstrated, such as plain, twill, satin and so on.

In this embodiment, the frame body is rectangular, the length of the Longitudinal bar 1 and the latitudinal bar 2 is 20 mm to 150 cm, and the Longitudinal bar 1 and the latitudinal bar 2 are equal in length, and a fast splicing connection structure can be disposed between the Longitudinal bar 1 and the latitudinal bar 2, which is convenient for disassembly and assembly, and saves space during transportation and storage. In other embodiments of the invention, the frame body can also be other shapes such as a trapezoid according to the specific demonstration requirements, and the frame body can be manufactured by integrated molding.

Both the Longitudinal bar 1 and the latitudinal bar 2 are provided with a scale line, through which the distance between the warp strips 6 and the weft strips 7 can be accurately adjusted, and thus the fabric construction in the same proportion as the actual fabric can be obtained. In order to achieve different demonstration effects, warp strips 6 or weft strips 7 can be made of fabrics such as braided ribbons or cloth strips, and each group of strips includes a plurality of strips with different colors and different widths. Different widths and colors can meet the different requirements in teaching or design. The width of the strips is proportional to the diameter of a variety of commonly used yarns. In the preferred embodiment of the invention, the warp strips or weft strips are made of an elastic braided ribbon. The elastic braided ribbons is selected so that the warp or weft strips are kept parallel to the frame body in various positions, keeping the fabric flat and taut at all times. In order to match the different proportions of strips, the longitudinal bar 1 and the latitudinal bar 2 can also be provided with multiple sets of scale lines with different units or specifications, thereby achieving a variety of effects.

Figure 2:
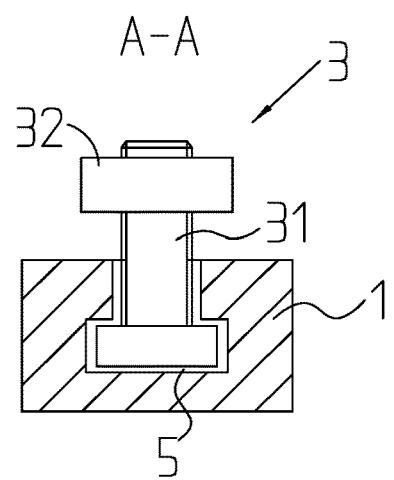
FIG. 2 is a cross-sectional view along A-A in FIG. 1.

Since the warp strips or weft strips are fixed to the frame body through the positioning members 3, it is required that the positioning members 3 can fix the strips and the position of the positioning member 3 on the frame can be adjusted, and the structure of the positioning member 3 determines the operation complexity of fixing strips. In the first embodiment of the invention, as shown in FIG. 1 and FIG. 2, the longitudinal bar 1 and/or the latitudinal bar 2 are provided with slide rails 5 with an inverted T-shaped cross section, the positioning member 3 comprises a slider 31 which is slidably connected in slide rails 5 and a positioning-nut 32 which is detachably connected to the slider 31. The slider 31 in this embodiment is composed of a bolt, the head of the bolt can slide in the slide rails 5, while the positioning-nut 32 is a nut with internal threads, and the screw rod of the slider 31 is detachably connected with the positioning-nut 32 through threaded connection. Correspondingly, both the ends of the warp strips and the weft strips are provided with rings or holes through which the slider 31 can pass. In this embodiment, the warp strips and/or the weft strips can be fixed on the frame body at a certain position by sheathing them on the screw rod of the slider 31 by means of holes, and tightening the positioning-nut 32.

Figure 3:
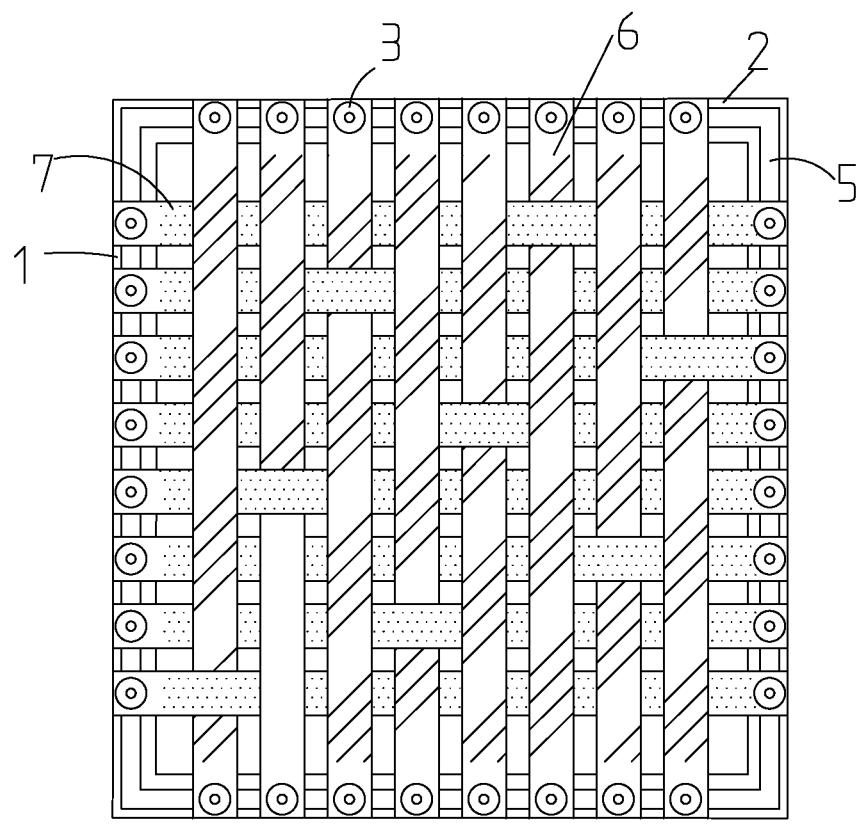
FIG. 3 is a schematic diagram showing that the tool demonstrates the satin fabric.

The fabric demonstration tool of the invention can demonstrate the structure of a fabric, a yarn dyed fabric, etc. FIG. 3 is a schematic diagram showing demonstration of a satin weave.

Figure 4:
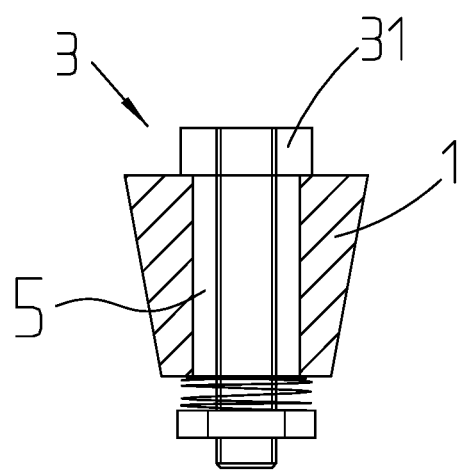
FIG. 4 is a schematic diagram of a positioning member in the embodiment 2 of the present invention.

In Embodiment 2, as a simplification of Embodiment 1, the structure of the positioning member also can be as shown in FIG. 4, and the positioning members 3 can be inserted into the slide rails 5 and elastically connected with the frame body. The positioning member 3 comprises a slider 31 with two thick ends and a thin middle part, wherein the thin part of the slider 31 pass through the slide rails 5, and a gasket and a spring are arranged between the lower end of the slider 31 and the frame body, thus, the upper end of the slider 31 is elastically pressed on the upper side of the frame body. When the positioning member 3 needs to be moved, the slider 31 can be raised to slide within the slide rails 5. After sliding, the slider 31 is lowered and the spring presses the entire positioning member 3 on the longitudinal bar 1 and/or latitudinal bar 2 due to its own pre-tightening force, so that the positioning member 3 cannot move freely. In this embodiment, the movement of the positioning member 3 is simpler and the positioning-nut 32 will not be disassembled frequently.

In other embodiments of the invention, the strips can also be fixed on the slider by means of a clip, in this case, the positioning member 3 is composed of a positioning clip and a slider, the positioning clip holds a the warp strips and/or the weft strips, and the slider can slide within the slide rail 5. In this embodiment, holes or rings will not be provided on the warp strips and/or the weft strips.

Figure 5:
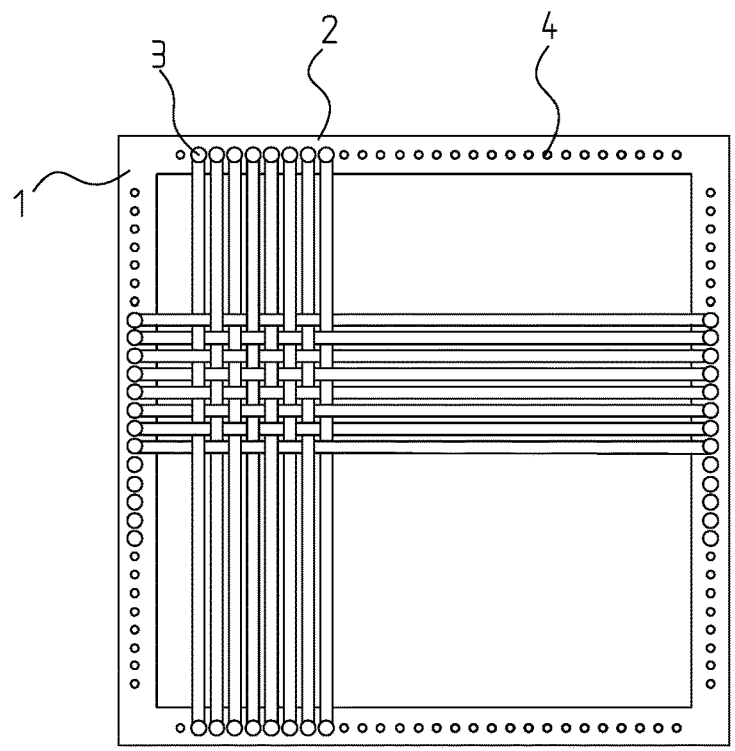
FIG. 5 is a schematic diagram of embodiment 3 of the present invention (woven plain fabric)

FIG. 5 shows an embodiment 3 of the invention, which differs from embodiment 1 in that the slide rails 5 arranged in the longitudinal bar 1 and/or latitudinal bar 2 is eliminated, instead, a plurality of positioning-holes 4 are opened on the longitudinal bar 1 and the latitudinal bar 2 corresponding to the scale lines with equal spacing between adjacent positioning-holes 4, and the positioning member 3 is composed of a bolt, the strips is secured to the frame body when the bolt passes through the hole or ring of the warp strips and/or weft strips to fit the positioning-hole 4. This design utilizes the cooperation of the positioning member 3 with positioning-hole 4, instead of threaded connection, it is configured as pluggable and thus is very convenient for use. In practice, only some holes may be used, as shown in FIG. 5, the effect of plain weave fabric is demonstrated.

Figure 6:
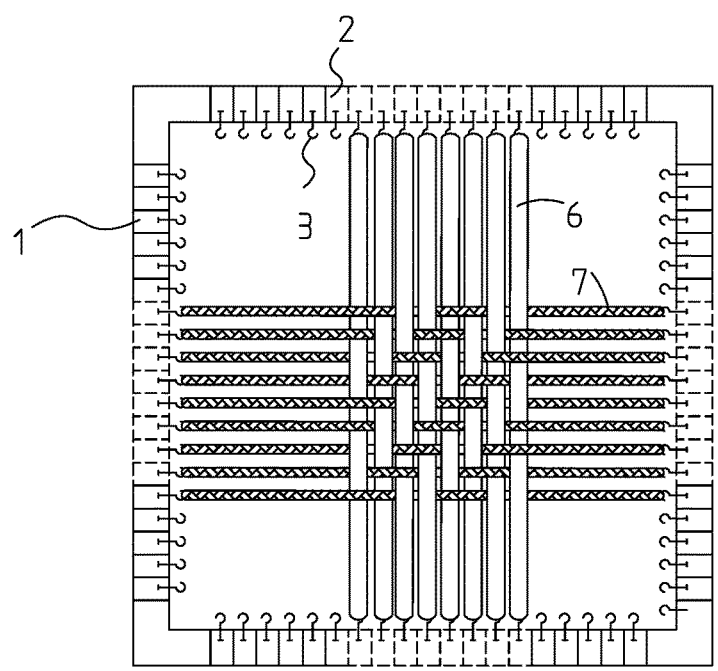
FIG. 6 is a schematic diagram of embodiment 4 of the present invention (braided reinforced twill fabric).

FIG. 6 shows an embodiment 4 of the invention, which differs from embodiment 3 in that a plurality of positioning members with equal spacing are fixed to the longitudinal bar 1 and/or the latitudinal bar 2, and the positioning member has a hook part, while the ends of the warp strips and weft strips have a ring or sleeve, or the hook part of the positioning member has a tip capable of passing through the warp strip and weft strip, thereby enabling the strips to be hooked on the hook part of the positioning member 3 for convenient disassembly. And FIG. 6 is a schematic diagram showing weaving and demonstrating reinforced twill weave using the demonstration appliance of the present invention.

In the preferred embodiments of the invention, the frame body is made of aluminum alloy or engineering plastic, while in the other embodiments of the invention, the frame body can also be made of a soft material, the positioning member has a tip that can pass through the soft material. After knitting, the tip of the positioning member passes through the warp strips or weft strips firstly, and then passes through or is fixed on the soft material.

The embodiments are intended only to illustrate the technical conception and characteristics of the invention, and are intended to enable whom familiar with the technology to understand the content of the invention and implement it accordingly, and can not thereby limit the scope of protection of the invention. All equivalent changes or modifications made in accordance with the spirit of the invention shall be covered within the scope of protection of the invention.

The invention claimed is:

1. A teaching and demonstration tool for simulating fabric construction, comprising:
a frame body, for fixing a plurality of warp strips and a plurality of weft strips;
a plurality of pairs of positioning members, for fixing two ends of the warp strips and the weft strips, respectively, on the frame body;
wherein the frame body comprises at least a pair of longitudinal bars and at least a pair of latitudinal bars, the longitudinal bars and latitudinal bars are provided with scale lines, and
wherein slide rails are opened on the frame body along the longitudinal direction or the latitudinal direction; said positioning member comprises a slider at least partially and slidably arranged in said slide rails.

2. The tool according to claim 1, wherein the frame body is provided with a plurality of sets of different scale lines.

3. The tool according to claim 1, wherein the positioning member also includes a positioning-nut detachably connected to the slider, when the positioning-nut is connected to the slider, the warp strip or the weft strip is fixed between the positioning-nut and the frame body; when the positioning-nut is separated from the frame body, the warp strip or the weft strip is detachable from the frame body.

4. The tool according to claim 1, wherein the slider is elastically connected to the slide rail, the warp strip or the weft strip is clamped between the slider and the frame body.

5. The tool according to claim 1, wherein the positioning member includes a positioning clip connected to the slider, the warp strip or the weft strip is clamped by the positioning clip.

6. The tool according to claim 1, wherein both the warp strip and the weft strip have two ends, each of the ends is provided with a hole or a ring through which the positioning member can pass.

7. The tool according to claim 1, wherein the tool comprises a plurality of warp strips and weft strips of different colors.

8. The tool according to claim 1, wherein the tool comprises a plurality of warp strips and weft strips of different widths.

9. The tool according to claim 1, wherein the warp strips and the weft strips are braided ribbons.

10. The tool according to claim 1, wherein the warp strips and the weft strips are elastic.

11. The tool according to claim 1, wherein the frame body is rectangular.

12. The tool according to claim 1, wherein the longitudinal bar and the latitudinal bar have a length of 20 to 150 cm.

13. The tool according to claim 1, wherein the frame body is made of a soft material, the positioning member has a tip capable of passing through the warp strip or the weft strip and fix it to the frame body.

* * * * *